United States Patent
Ichikawa et al.

(10) Patent No.: US 7,603,929 B2
(45) Date of Patent: Oct. 20, 2009

(54) ROLLING BEARING, CAM-FOLLOWER WITH ROLLER, AND CAM

(75) Inventors: Kenichi Ichikawa, Iwata (JP); Yasuyuki Watanabe, Iwata (JP)

(73) Assignee: NTN Corporation, Osaka (JP)

( * ) Notice: Subject to any disclaimer, the term of this patent is extended or adjusted under 35 U.S.C. 154(b) by 746 days.

(21) Appl. No.: 10/859,120

(22) Filed: Jun. 3, 2004

(65) Prior Publication Data
US 2004/0247216 A1    Dec. 9, 2004

(30) Foreign Application Priority Data

| Jun. 5, 2003 | (JP) | ............................ 2003-160720 |
| Mar. 18, 2004 | (JP) | ............................ 2004-078794 |
| May 27, 2004 | (JP) | ............................ 2004-158046 |

(51) Int. Cl.
*C21D 1/10* (2006.01)
*F01L 1/18* (2006.01)

(52) U.S. Cl. ........................... 74/569; 384/492; 384/569

(58) Field of Classification Search ................. 384/492, 384/569; 74/567
See application file for complete search history.

(56) References Cited

U.S. PATENT DOCUMENTS

| 5,054,440 A | 10/1991 | Kadokawa |
| 6,224,688 B1 | 5/2001 | Takemura et al. |
| 6,309,475 B1 | 10/2001 | Takayama et al. |
| 6,440,233 B2 | 8/2002 | Okita et al. |

| 2003/0123769 A1* | 7/2003 | Ohki ........................ 384/492 |
| 2004/0228561 A1* | 11/2004 | Okugami et al. ............ 384/569 |

FOREIGN PATENT DOCUMENTS

| EP | 0 950 723 | 10/1999 |
| JP | 63-185917 | 11/1988 |
| JP | 5-321618 | 7/1993 |
| JP | 05-239550 | 9/1993 |
| JP | 6-15811 | 3/1994 |
| JP | 6-80287 | 10/1994 |
| JP | 62-7908 | 1/1997 |
| JP | 10-030150 | 2/1998 |
| JP | 10-47334 | 2/1998 |

(Continued)

OTHER PUBLICATIONS

European Search Report, Apr. 6, 2006.

(Continued)

*Primary Examiner*—William C Joyce
(74) *Attorney, Agent, or Firm*—McDermott Will & Emery LLP

(57) ABSTRACT

A rolling bearing that attains long life against surface damage such as surface-originating separation or internally originating separation and allows caulking of its shaft end face, a cam-follower with roller employing the rolling bearing, and a cam are obtained. The rolling bearing includes an outer-roller, a roller shaft located inside the outer-roller, and a rolling element interposed between the outer-roller and the roller shaft. At least one member of the outer-roller and the roller shaft has a nitrogen enriched layer. A surface portion of an area in a rolling contact surface where the rolling element rolls has austenite grain size of No. 11 or larger. The end portion has hardness of not larger than HV300.

14 Claims, 9 Drawing Sheets

FOREIGN PATENT DOCUMENTS

| | | |
|---|---|---|
| JP | 10-103339 | 4/1998 |
| JP | 10-110720 | 4/1998 |
| JP | 11-080897 | 3/1999 |
| JP | 11-101247 | 4/1999 |
| JP | 2000-38906 A | 2/2000 |
| JP | 2000-38907 A | 2/2000 |
| JP | 2000-205284 | 7/2000 |
| JP | 2001-336404 | 12/2001 |
| JP | 2002-31212 A | 1/2002 |
| JP | 2002-194438 A | 7/2002 |

OTHER PUBLICATIONS

Chinese Office Action, with English Translation issued in corresponding Chinese Patent Application No. 200410048844.X dated on Nov. 2, 2007.

Japanese Office Action, with English translation, issued in Japanese Patent Application No. 2004-158046, mailed May 26, 2009.

* cited by examiner

HEAT PATTERN H1

HEAT PATTERN H2

HARDNESS MEASUREMENT POSITION

ROLLING BEARING, CAM-FOLLOWER WITH ROLLER, AND CAM

BACKGROUND OF THE INVENTION

1. Field of the Invention

The present invention relates to a rolling bearing, a cam-follower with roller employing the rolling bearing, and a cam.

2. Description of the Background Art

Recently, demand for high-speed and high-load application of a full type roller bearing without cage such as a bearing for a rocker arm among rolling bearings has increased. In the present specification, the full type roller bearing and other rolling bearings are not particularly distinguished, and both are referred to as a rolling bearing herein. In the rolling bearing without cage, interference among rollers is inevitable, and a lubricant is not sufficiently supplied to the inside of the bearing. Accordingly, separation originating from a surface of a roller or a race may occur.

If the roller rotates with high speed, surface damage may occur in the roller due to assembly error or unbalanced load, or skew tends to be caused because a roller position is not smoothly controlled. As such, surface-originating separation due to slipping or internally originating separation due to local increase in surface pressure may take place. Consequently, heating due to slipping or local increase in surface pressure takes place, resulting in surface damage such as peeling, smearing or surface-originating separation or internally originating separation in spite of mathematically large load capacity.

Approaches shown below have been proposed in order to solve the above-described problems.

(1) In Japanese Patent Laying-Open No. 2000-38907, a bearing for cam-follower device for engine valve mechanism attains mathematically calculated life of the bearing of not less than 1000 hours at a rated engine speed.

(2) Japanese Patent Laying-Open No. 10-47334 discloses a bearing shaft for cam-follower device for engine valve mechanism in which carbide accounts for 10% to 25%, decomposition ratio of retained austenite to an initial value is set to $\frac{1}{10}$ to $\frac{3}{10}$, end face hardness is set to HV830 to 960, and average wavelength of surface roughness is set to not larger than 25 μm. In order to realize these characteristics, bearing steel is subjected to carbonitriding treatment and hard shot peening.

(3) Japanese Patent Laying-Open No. 10-103339 discloses a cam-follower shaft in which a solid lubricating film composed of high polymer or the like is formed on the shaft in order to improve abrasion resistance thereof.

(4) Japanese Patent Laying-Open No. 10-110720 discloses a cam-follower shaft manufactured from tool steel, for example, and attaining high hardness through ion nitriding or ion plating at a temperature lower than a tempering temperature.

(5) Japanese Patent Laying-Open No. 2000-38906 discloses a bearing for cam-follower device for engine valve mechanism, in which bending stress to a shaft is regulated to be not larger than 150 MPa.

(6) Japanese Patent Laying-Open Nos. 2000-205284 and 2002-31212 disclose a cam-follower for engine valve mechanism in which a phosphate coating having an excellent lubricant retaining property is applied to a rolling contact surface of a bearing component.

(7) Japanese Utility Model Laying-Open No. 63-185917 discloses a cam-follower for engine valve mechanism in which a roller rolling area of a shaft is crowned.

(8) Japanese Patent Laying-Open No. 2002-194438 discloses a shaft, in which a surface layer implementing a rolling contact surface of the shaft is subjected to high-concentration carburizing treatment or carbonitriding treatment in order to attain carbon concentration of 1.2% to 1.7% and an inner portion has a hardness of approximately HV300.

Meanwhile, when the cam-follower with roller in the engine is fixed to a rocker arm, opposite end faces of a shaft of the cam-follower are sometimes subjected to caulking forming so as to be caulked to a shaft support member. Here, the rolling contact surface of the roller should have high hardness, whereas the end portion should be soft so as to allow caulking forming. A number of developments taking into account such a characteristic have been made, as disclosed in Japanese Patent Laying-Open Nos. 5-321616 and 62-7908, and Japanese Patent Publication Nos. 6-15811 and 6-80287, for example.

In the future, however, tendency toward the use of the cam-follower with roller in the engine under higher speed and higher load conditions as well as lower viscosity of a lubricant is inevitable, as with an ordinary bearing. Here, improvement in rolling contact fatigue life under such condition of use is demanded.

An object of the present invention is to provide a rolling bearing that attains long life against surface damage such as surface-originating separation or internally originating separation under harsh condition of use and allows facilitated caulking work of an end portion, a cam-follower with roller employing the rolling bearing, and a cam.

SUMMARY OF THE INVENTION

A rolling bearing according to the present invention includes an outer member, an inner member located inside the outer member, and a rolling element interposed between the outer member and the inner member. At least one member of the outer member and the inner member has a nitrogen enriched layer. In at least one member, austenite grain size of a surface portion of an area in a rolling contact surface where the rolling element rolls is No. 11 or larger, and an end portion of that member has hardness of at most HV (Vickers hardness) 300.

With such a structure, surface damage such as surface-originating separation and internally originating separation is suppressed in the surface portion of the area in the rolling contact surface, whereby long life is attained. In addition, since hardness of the end portion of the member is limited as described above, caulking forming is facilitated. If the austenite grain size of the surface portion in the rolling contact surface is less than No. 11, rolling contact fatigue life under harsh condition of use cannot be extended. Therefore, austenite grain size in the surface portion is set to not smaller than No. 11. Moreover, the nitrogen enriched layer is disposed in order to refine and strengthen microstructure by subjecting the nitrogen enriched layer to high-frequency quenching. Here, austenite grain refers to grain of austenite that has undergone phase transformation during quenching and heating, that is, grain that remains as history even after austenite has transformed into martensite by cooling. The austenite grain described above may be any austenite grain having a grain boundary that can be observed by subjecting a metal phase sample of a member of interest to a treatment for developing the grain boundary such as etching. In a sense of grain boundary at the time of heating immediately before low-temperature quenching, the austenite grain may be referred to as "prior austenite grain". For measurement of the grain size, the average of JIS-defined grain size numbers may be converted to obtain an average grain size, or the intercept method or the like may be used, in which a straight line is placed on a metal phase structure in a random direction to obtain an average length between points at which the straight line encounters grain boundaries, followed by multiplying the obtained average length by a correction coefficient so as to obtain a length of three dimension from a length of two dimension.

As will be described later, the nitrogen enriched layer is formed by nitrocarburizing treatment. Here, the nitrogen enriched layer may or may not be enriched with carbon.

In an area other than the surface portion of the area in the rolling contact surface, microstructure of the area may contain ferrite and carbide.

Here, ferrite refers to a phase of iron, and such ferrite does not contain a dislocation in high density as in martensite. Ferrite generated by slow cooling from austenite ($\gamma$) phase or ferrite sufficiently tempered after quenching is one example. Carbide such as cementite corresponding to the ferrite with low dislocation density as above is dispersed in an aggregated and coarsened state. Therefore, the microstructure containing the ferrite described above and the carbide adapts to a typical softened state.

Carbide mainly refers to cementite $Fe_3C$. The nitrogen enriched layer, however, contains nitrogen to a large extent, though not as much as carbon. Therefore, more appropriately, carbide may cover carbonitride such as $Fe_3(C, N)$. For the sake of simplicity of description, it is assumed herein that carbide may include the carbonitride. In addition, as a steel product normally contains Mn or the like, such an element is dissolved in carbide and takes a form such as $(Fe, Mn)_3(C, N)$. Note that such a form is naturally included. Moreover, when tempering is performed at a high temperature, not only a $M_3C$ type carbide but also $M_{23}C_6$ type carbide and other carbides are included. Note that the carbide described above also includes such types of carbide.

The surface portion of the area in the rolling contact surface may be formed by high-frequency quenching. The surface portion can have hardness of at least HV653.

In this manner, suppression of surface damage and internally originating separation in the surface portion is ensured, whereby long life is attained. In addition, caulking work in other portions can be facilitated. If the surface portion has hardness less than HV653, improvement in life under the conditions above will be difficult to achieve. Meanwhile, if the portion other than the surface portion has hardness exceeding HV300, caulking work in a mass production process will be difficult.

The surface portion of the area in the rolling contact surface can contain 10 to 50 volume % of retained austenite. In this manner, fracture development due to surface originating separation or internally originating separation can be suppressed. If the retained austenite accounts for less than 10 volume %, long life under harsh condition of use cannot be attained. On the other hand, if the retained austenite accounts for more than 50 volume %, fine retained austenite cannot be obtained. Instead, life under such condition of use may be shortened.

Measurement of the retained austenite can be performed by using a well-known methods such as X-ray diffraction method and transmission electron microscopy (TEM). Austenite may be measured by using a magnetic measurement device such as magnetic balance, because it is not ferromagnetic as ferrite or cementite.

At least one member described above may be subjected to any one of a treatment of carbonitriding the member at $A_1$ point or higher followed by slow cooling down to a point lower than the $A_1$ point and then subjecting the surface portion to high-frequency quenching, and a treatment of carbonitriding the member at the $A_1$ point or higher followed by rapid cooling down to a point lower than the $A_1$ point, tempering at the point lower than the $A_1$ point, and subjecting the surface portion to high-frequency quenching. Here, the $A_1$ point described above corresponds to a eutectic temperature, and it is set to 723° C. for Fe—C system, for example. The $A_1$ point of the steel product normally used in the rolling bearing is also a temperature around 723° C.

Through the treatment described above, a member that attains long life because it is less susceptible to various damages in the surface portion and allows facilitated caulking work in other portions can be obtained. The surface-portion subjected to high-frequency quenching has austenite grain size of No. 11 or larger defined in JIS, contains 10 to 50 volume % of retained austenite, and has hardness of not smaller than HV653. This is because the member is subjected to carbonitriding treatment and because the surface portion thereof including the rolling contact surface is subjected to high-frequency quenching. In addition, a portion not affected by high-frequency quenching attains hardness of not larger than HV300, because quenching and tempering (tempering) treatment is performed even when slow cooling or rapid cooling is performed after carbonitriding treatment.

The rolling bearing described above is employed in a cam-follower with roller. In the cam-follower with roller, a roller rolling along an inner circumference of an outer-roller is interposed between the outer-roller serving as the outer member and a shaft serving as the inner member. The cam-follower is supported by that shaft. A portion where the roller rolls is assumed as the surface portion of the area in the rolling contact surface of the shaft.

With such a structure, occurrence of damage from a rolling contact portion of the outer-roller in the cam-follower with roller is suppressed, and long life can be attained.

The rolling bearing described above is employed in a cam-follower with roller. A shaft of the cam-follower with roller has its end portion subjected to plastic working and is fixed to a roller support member.

With such a structure, caulking work at an end portion of the shaft, for example, can be facilitated.

A body of the cam follower may be obtained by press-working.

By press-working described above, the cam-follower body can be manufactured efficiently and in a large amount. Press-working is specifically a kind of cold forging and the like.

A cam according to the present invention abuts on the outer member provided in a rocker arm. The surface portion abutting on the outer member of the cam has austenite grain size of No. 11 or larger.

With such a structure, surface damage such as surface-originating separation and internally originating separation are suppressed in the surface portion of the cam, and longer life can be attained.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
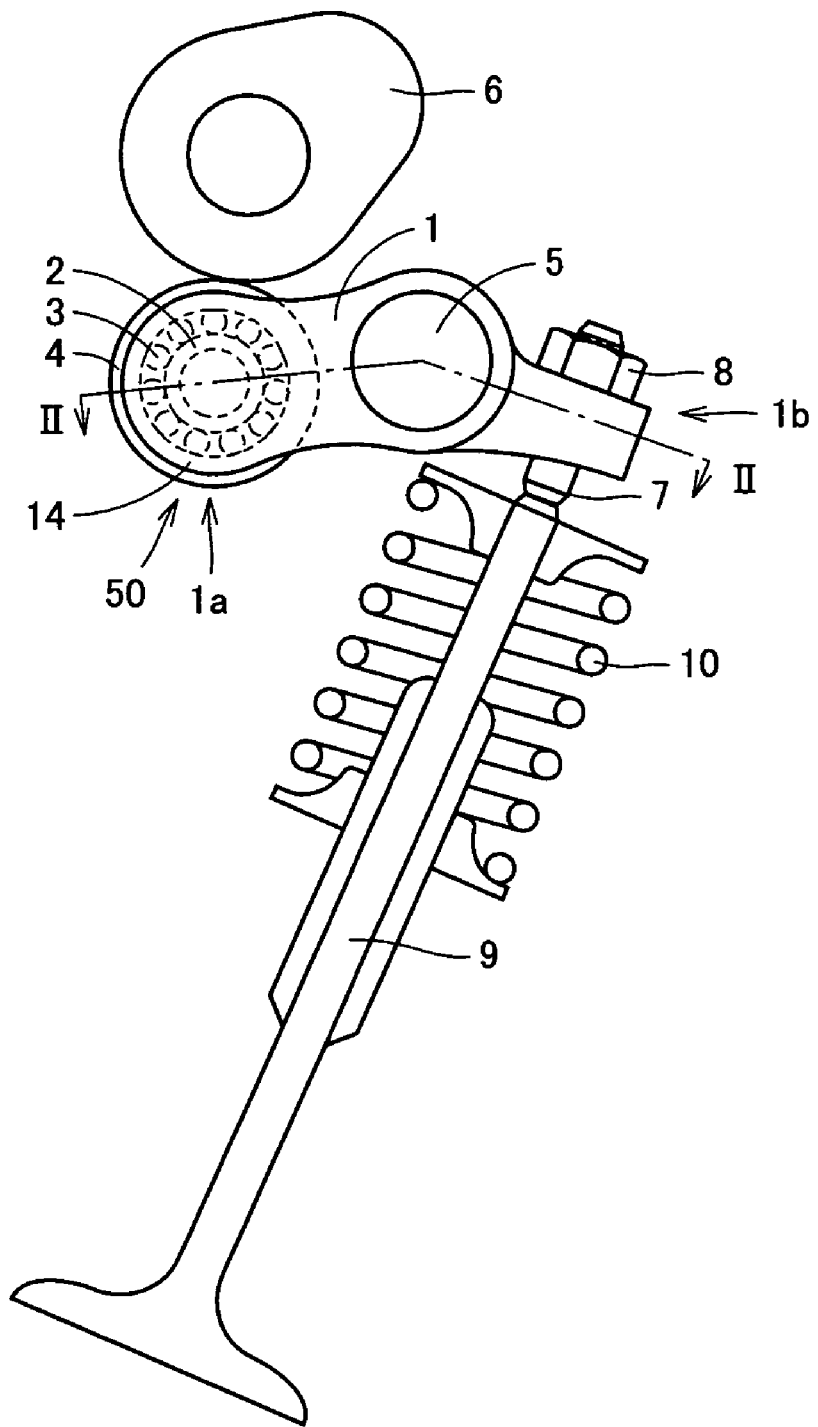
FIG. 1 shows a cam-follower with roller in an engine in an embodiment of the present invention.
Figure 2A:
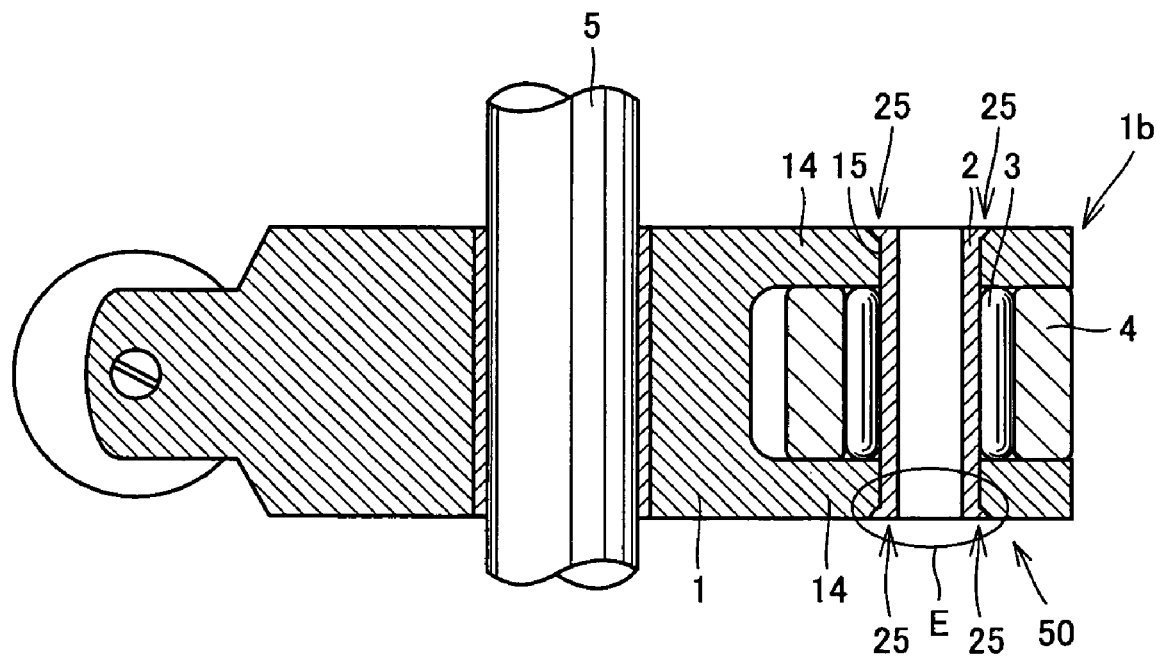
FIG. 2A is a cross-sectional view along the line II-II in FIG. 1.

In the following, embodiments of the present invention will be described with reference to the figures. FIG. 1 is a schematic front view showing a structure of a cam-follower with roller in an engine in an embodiment of the present invention. FIG. 2A is a cross-sectional view along the line II-II in FIG. 1. Referring to FIGS. 1 and 2A, a rocker arm 1 which is a pivotable member is rotatably supported by a rocker arm shaft 5 via a bearing metal in the center.

An adjust screw 7 is inserted and screwed into one end portion 1b of rocker arm 1. Adjust screw 7 is fixed by a locknut 8 and abuts on an upper end of a suction valve or an exhaust valve 9 of an internal combustion engine at its lower end. Valve 9 is biased by resilience of a spring 10.

Figure 2B:
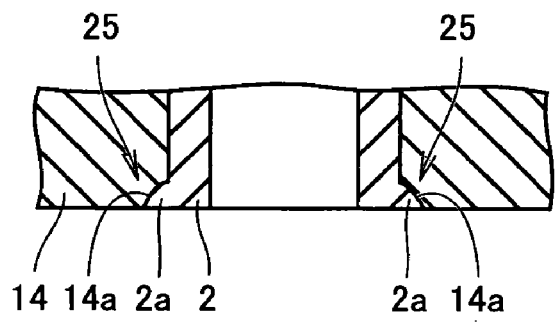
FIG. 2B shows an enlarged view of a portion E in FIG. 2A and shows a caulked fixing portion.

Rocker arm 1 has a cam-follower body 50 provided at the other end 1a. Cam-follower body 50 is integrated with a roller support portion 14 formed in a bifurcated manner. As shown in FIG. 2B showing an enlarged view of portion E in FIG. 2A, bifurcated roller support portion 14 is provided with a beveled portion 14a. In addition, opposite ends 2a of a roller shaft 2 representing the inner member are caulked, so as to form caulked portions 25 for fixing. In other words, at least opposite ends 2a of the roller shaft have hardness not exceeding HV300 so as to allow facilitated caulking, whereby the end portions are subjected to caulking, and caulked fixing portion 25 is formed at the beveled portion of the roller support portion.

In the center of an outer circumferential surface of roller shaft 2, an outer-roller 4 implementing the outer member is rotatably supported, with a roller 3 representing a rolling element interposed. Roller 3 implements a bearing interposed between roller shaft 2 and outer-roller 4. In other words, the bearing interposed between roller shaft 2 and outer-roller 4 may be referred to as a roller. An axis direction of roller 3 is arranged in parallel to an axis of the roller shaft. An outer circumferential surface of outer-roller 4 abuts on a cam surface of a cam 6 provided on a cam shaft by a biasing force of spring 10. It is noted that "one" and "the other" herein are not particularly distinguished, and an end portion that appears first is simply referred to as "one" end portion.

Here, a rolling bearing constituted of roller shaft 2, roller 3 and outer-roller 4 is employed as a rolling bearing for rocker arm. When a cage is not used, a rolling bearing is generally referred to as a full type roller bearing. In the present specification, however, the rolling bearings are not particularly distinguished. As the rolling bearing for rocker arm rotates while being in contact with cam 6, pressing force and impact force from cam 6 are applied to outer-roller 4. The cam-follower with roller in the engine in the embodiment of the present invention is a member including the rolling bearing for rocker arm and the cam-follower body described above.

In the cam-follower with roller in the present embodiment, roller shaft 2 has a nitrogen enriched layer, of which surface portion of the area in the rolling contact surface of the roller shaft 2 is subjected to high-frequency quenching, and has ultrafine austenite grain size of No. 11 or larger (defined in JIS) as well as hardness of not smaller than HV653. A portion other than the surface portion of the area in the rolling contact surface has a relatively coarse ferrite grain size or austenite grain size of not larger than No. 10. In addition, the end portion of roller shaft 2 has low hardness such as not larger than HV300. As the surface portion of the area in the rolling contact surface has been subjected to high-frequency quenching, retained austenite accounts for 10 to 50 volume % therein. As a result, surface damage and internally originating separation are less likely in the surface portion. On the other hand, as other portion has low hardness, facilitated caulking is allowed.

Figure 3:
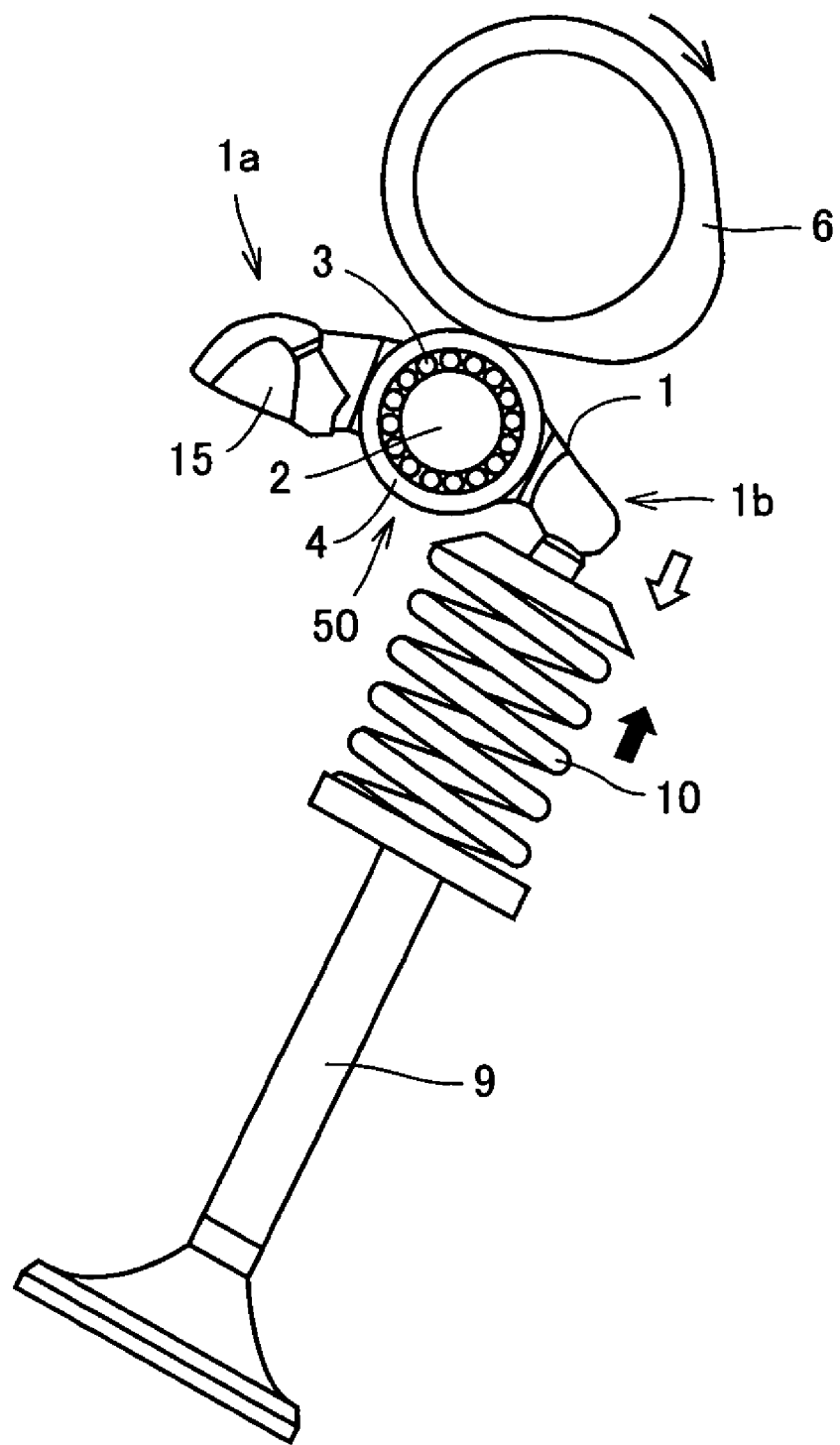
FIG. 3 shows a cam-follower with roller in an engine in another embodiment of the present invention.

FIG. 3 shows a cam-follower with roller in an engine in another embodiment of the present invention. In cam-follower body 50, roller shaft 2 is fixed in a roller hole (not shown) extending between two sidewalls and opened between one end portion 1b and the other end portion 1a of rocker arm 1. One end abuts on an end portion of engine open/close valve 9, while the other end abuts on a not-shown pivot. Cam-follower body 50 provided with a pivot receiving portion 15 is biased by spring 10 in a prescribed direction around the valve, and receives a driving force transmitted from cam 6 so as to move valve 9 against the biasing force by the spring.

Figure 4:
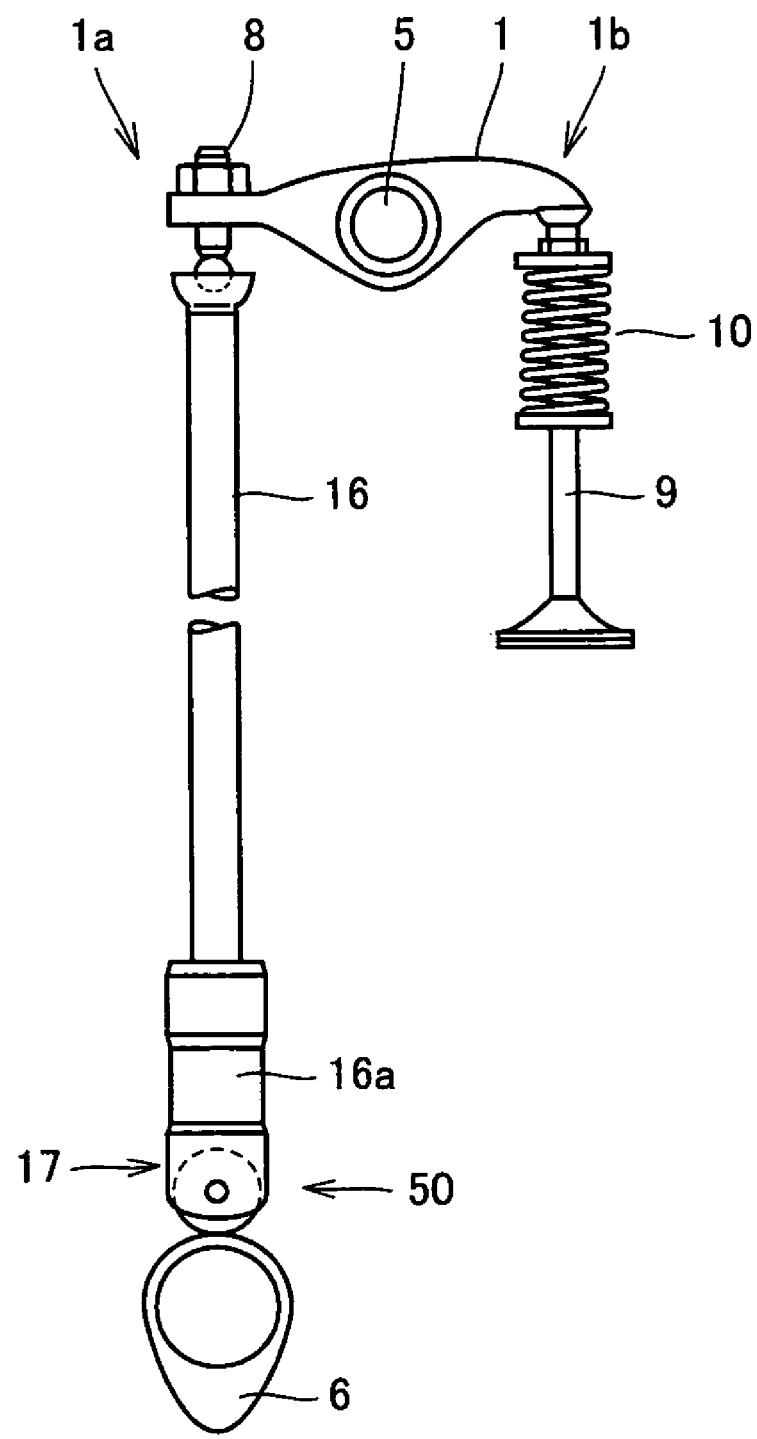
FIG. 4 shows a cam-follower with roller in an engine in yet another embodiment of the present invention.
Figure 5:
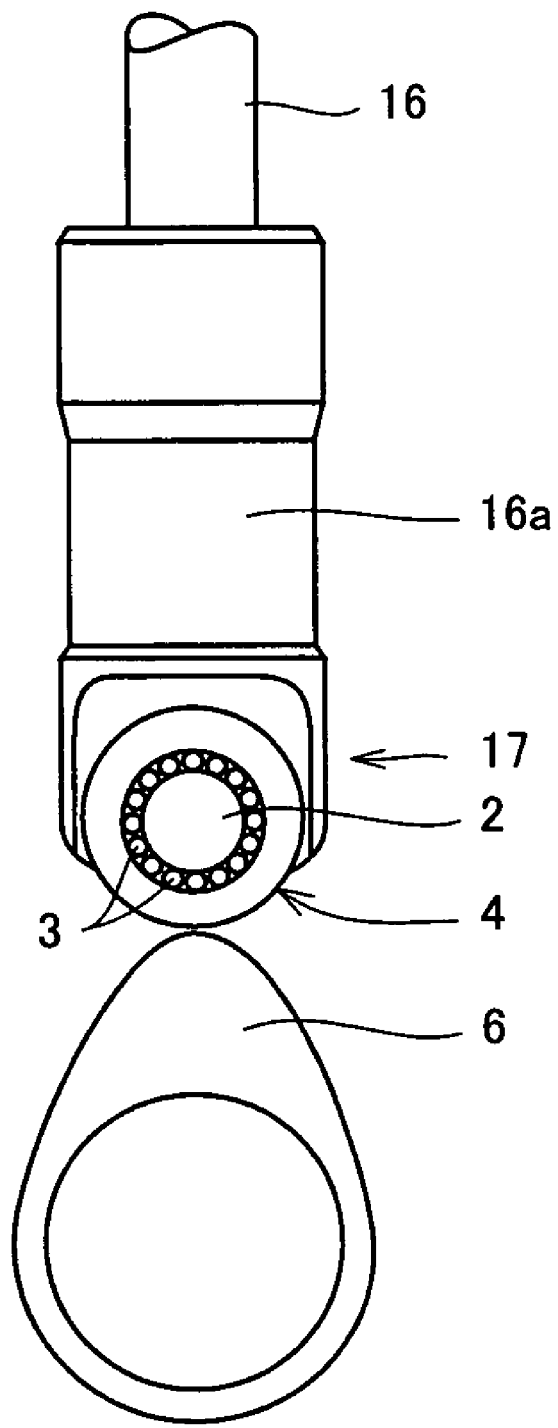
FIG. 5 is an enlarged view of a portion of a full type roller bearing coming in contact with a cam in the cam-follower with roller in the engine in FIG. 4.

FIG. 4 shows a cam-follower with roller in an engine in yet another embodiment of the present invention. FIG. 5 is an enlarged view of a portion including the rocker arm rolling bearing in FIG. 4. In FIG. 4, rotation shaft 5 is arranged in the center of rocker arm 1, around which rocker arm 1 pivots. End portion 1b of one arm of rocker arm 1 abuts on an end of engine valve 9, while end portion 1a of the other arm abuts on an end of a connecting bar 16. Adjust screw 8 attains a function to adjust an abutment position of end portion 1a of the rocker arm and connecting bar 16.

Cam-follower body 50 is provided in a hollow bearing attachment portion 16a located at a lower end of connecting bar 16. The rolling bearing for rocker arm is attached to cam-follower body 50 by means of an attachment member 17. Cam 6 abuts on outer-roller 4 of the rolling bearing so as to transmit a driving force to the connecting bar.

Among the members constituting the rolling bearing for the cam-follower with roller in the engine, roller shaft 2 representing the inner member is subjected to heat treatment which will be described below, so that the surface portion thereof includes ultrafine austenite grains.

Roller shaft 2 representing the inner member in FIGS. 3 and 5 has a nitrogen enriched layer, of which surface portion of the area in the rolling contact surface is subjected to high-frequency quenching and has ultrafine austenite grain size of No. 11 or larger (defined in JIS) as well as hardness of not smaller than HV653. A portion other than the surface portion of the area in the rolling contact surface has a relatively coarse austenite grain size of not larger than No. 10 and low hardness such as not larger than HV300. As the surface portion of the area in the rolling contact surface has been subjected to high-frequency quenching, retained austenite accounts for 10 to 50 volume % therein. As a result, surface damage and internally originating separation are less likely in the surface portion. On the other hand, as other portion has low hardness, facilitated caulking is allowed. Therefore, though not shown, opposite ends of the roller shaft are caulked, so as to form caulked fixing portion in the beveled portion of the roller shaft support portion.

Figure 6:
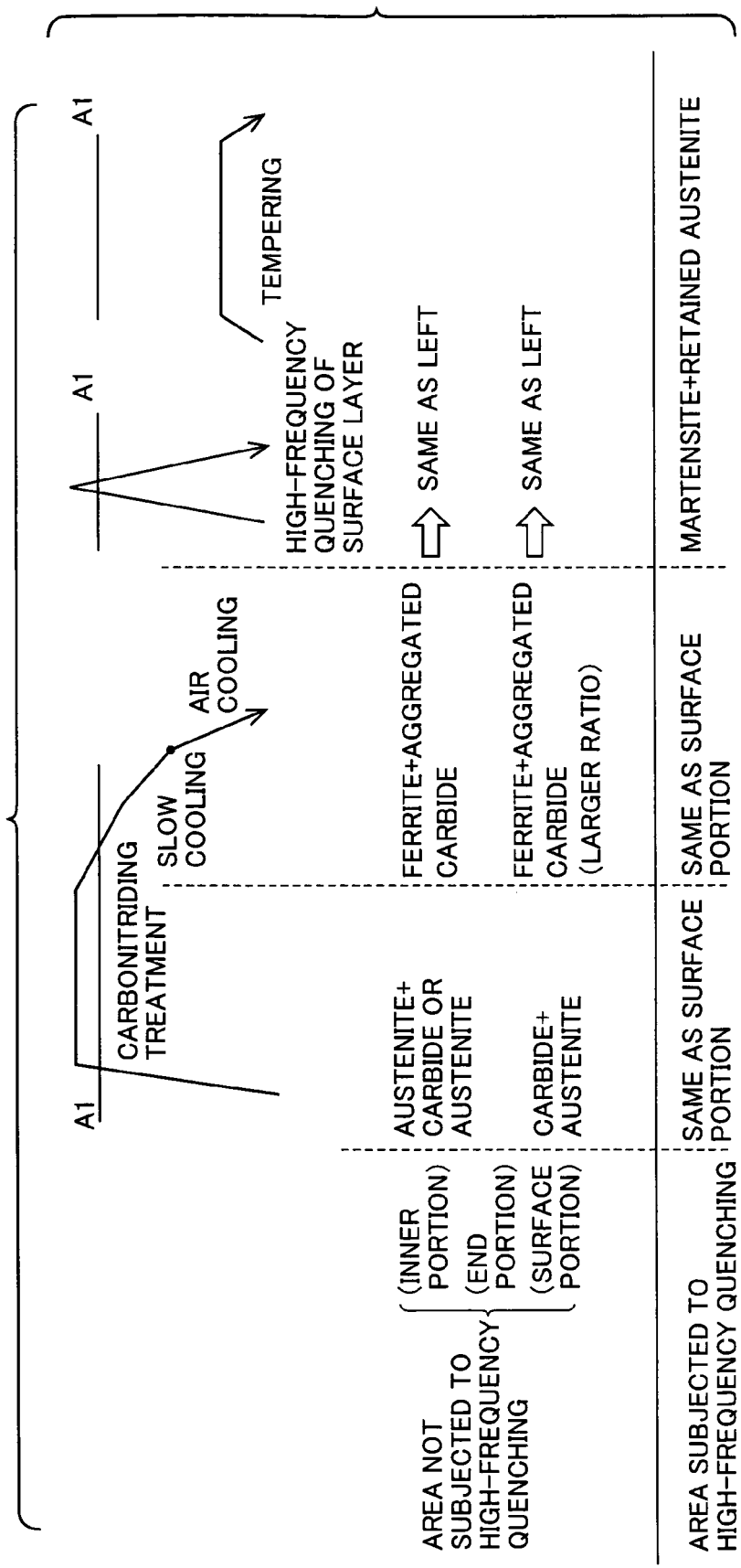
FIG. 6 illustrates a heat treatment pattern in the embodiment of the present invention.
Figure 7:
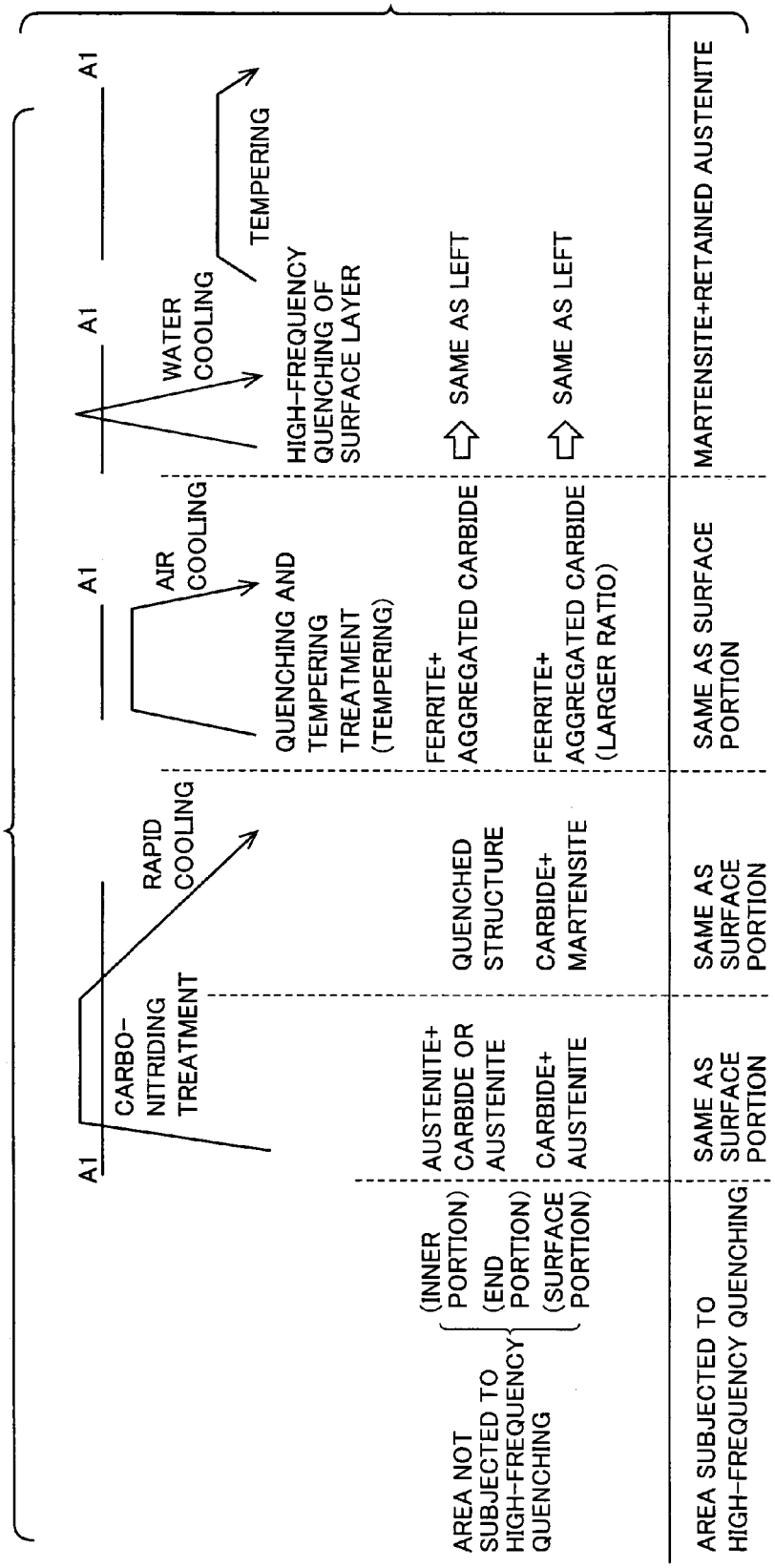
FIG. 7 illustrates another heat treatment pattern in the embodiment of the present invention.

A heat treatment including carbonitriding treatment applied to the inner member (roller shaft) will now be described. FIG. 6 illustrates a heat treatment method in the embodiment of the present invention, while FIG. 7 illustrates another heat treatment method in the embodiment of the present invention. FIG. 6 shows a heat treatment pattern in which carbonitriding treatment is performed at $A_1$ point or higher followed by slow cooling. On the other hand, FIG. 7 shows a heat treatment pattern in which carbonitriding treatment is performed followed by rapid cooling, and thereafter quenching and tempering treatment, that is, tempering treatment is performed at a point lower than the $A_1$ point. The slow cooling treatment in the heat treatment pattern in FIG. 6 and the quenching and tempering treatment in FIG. 7 correspond to each other, each contributing to lowering of hardness in the portion other than the surface portion. In both heat treatment patterns in FIGS. 6 and 7, the surface portion including the rolling contact surface is subsequently subjected to high-frequency quenching, and thereafter to low-temperature tempering.

The inner member in the bearing member and the cam can be subjected to any heat treatment of the above.

The nitrogen enriched layer which is a "carbonitrided layer" is formed through the carbonitriding treatment in any of the heat treatments described above. As carbon concentration in steel used as a material in the carbonitriding treatment is high, in some cases, carbon may not readily be introduced into the surface of steel from an atmosphere for a normal carbonitriding treatment. In the case of steel having high carbon concentration, for example, a carburized layer attaining a carbon concentration higher than that may be generated, or alternatively, generation of such a carburized layer attaining a carbon concentration higher than that may be unlikely. Though depending on Cr concentration or the like, nitrogen concentration in normal steel is as low as not larger than approximately 0.025 wt % at the maximum. Therefore, the nitrogen enriched layer is clearly generated regardless of the carbon concentration in the steel used as a material. In the present embodiment, the microstructure contains ferrite for the purpose of caulking. Accordingly, the carbon concentration is set relatively low, and the nitrogen enriched layer is also enriched with carbon in many cases.

How the microstructure is generated in each treatment in FIGS. 6 and 7 will now be described. The carbonitriding treatment is performed at $A_1$ point or higher, for example. In the carbonitriding treatment, the nitrogen enriched layer is formed in a member of interest in the rolling bearing. In the nitrogen enriched layer, C and N that are interstitial elements with respect to iron atom Fe are introduced in a hypereutectoid manner, and carbide is precipitated in austenite, for example (two phases coexist). In other words, hypereutectoid steel is obtained in the nitrogen enriched layer. In addition, in the inner portion which is not subjected to the carbonitriding treatment, austenite phase is obtained, depending on a composition of an original steel product used as a material. The carbonitriding treatment may be performed at a temperature at which two phases of ferrite and austenite or two phases of austenite and cementite coexist in the steel product used as the material.

Then, in cooling, in the pattern in FIG. 6 (referred to as heat pattern H1), slow cooling from a carbonitriding treatment temperature is performed. Slow cooling is performed in order to soften the structure as well as to improve workability. During slow cooling, pearlite composed of ferrite and cementite is generated from austenite described above in the inner portion. Here, cementite in pearlite is aggregated and coarsened without being layered, so as to promote softening. Therefore, a temperature range for slow cooling may be a range from the carbonitriding treatment temperature to approximately ($A_1$ point –100° C.). Even if slow cooling down to a temperature lower than this range is performed, aggregation and coarsening of cementite cannot be expected. Instead, it is time consuming and inefficient. As a guideline, the slow cooling temperature may be approximately 620° C. at the lowest. Subsequently, in order to save time, air cooling, water cooling, or oil cooling may be performed.

In the nitrogen enriched layer, pearlite is generated from austenite in carbide+austenite, and carbide in pearlite is aggregated and coarsened.

In the pattern in FIG. 7 (referred to as heat pattern H2), quenching by oil cooling, for example, is started from the carbonitriding treatment temperature. In this case, martensite or the like is generated from austenite in the inner portion, depending on a composition of an original steel product. As the martensitic structure is hard and caulking is difficult, the tempering treatment (quenching and tempering treatment) described above is performed. Tempering rapidly progresses at a temperature directly under $A_1$ point or at a temperature as close as possible to the $A_1$ point. That is, high-temperature tempering is performed. Therefore, desirably, tempering is performed in a range from the $A_1$ point to 650° C. or more preferably in a range from the $A_1$ point to 680° C. Through tempering, high dislocation density in martensitic structure disappears, and the structure composed of ferrite having low dislocation density and aggregated and coarsened cementite can be obtained.

In the nitrogen enriched layer, martensite is generated from austenite in (carbide+austenite) by quenching such as oil cooling. Martensite is softened by tempering described above, similarly to martensite generated in the inner portion. Carbide that has originally been present aggregates.

It is noted that, in description of the microstructure above, priority is given to clarity and nitrogen or a secondary factor in the actual, more complicated microstructure is not mentioned.

High-frequency quenching is performed in both heat patterns H1 and H2. In a stage preceding high-frequency quenching, the nitrogen enriched layer has had the structure in which aggregated carbide (larger ratio) and ferrite have existed in a mixed manner. In high-frequency quenching, heating is rapid. Here, carbide is dissolved and austenite nucleates. As the density of dispersed carbide is very high, austenite nucleation density is also very high and grain size in austenite structure formed by impingement of generated austenite is ultrafine. In addition, as the nitrogen enriched layer is the hypereutectoid steel, carbide also exists therein, which prevents growth of ultrafine austenite grains that have just been generated. In this manner, ultrafine austenite grains can be obtained in the nitrogen enriched layer. As the temperature for rapid heating is increased, carbide is dissolved and a larger amount of carbon is dissolved in ultrafine austenite.

Then, when quenching is performed after rapid heating, ultrafine austenite transforms into martensite. As a large amount of carbon has been dissolved, austenite is stabilized and austenite that has not transformed is left in a small area among martensite. This is referred to as the retained austenite. As the retained austenite is formed among martensite, it is extremely fine. Expressed as a volume ratio, the retained austenite accounts for 10 to 50 volume %.

Thereafter, tempering that will not lower hardness to a large extent is performed at approximately 180° C. Tempering at approximately 180° C. hardly causes high density dislocation to disappear, that is, density dislocation is maintained. Here, tempering is performed for stabilizing the structure. Tempering as above does not cause aggregation of cementite nor softening. This tempering may not be performed, depending on the steel product.

The structure that has undergone high-frequency quenching and contains retained austenite is strong, and attains long life even under harsh condition of use.

By performing the heat treatment described above, ultrafine austenite grain size in the surface portion of No. 11 or larger can be attained, and the inner microstructure can implement a structure of ferrite and carbide mixed. In addition, the surface portion can attain hardness of not smaller than HV653 and contain 15 to 35 volume % of retained austenite. On the other hand, the portion other than the surface can attain hardness of not larger than HV300. Therefore, the bearing part subjected to the heat treatment described above attains long life in terms of rolling contact fatigue characteristic and allows facilitated caulking.

EXAMPLES

Figure 8:
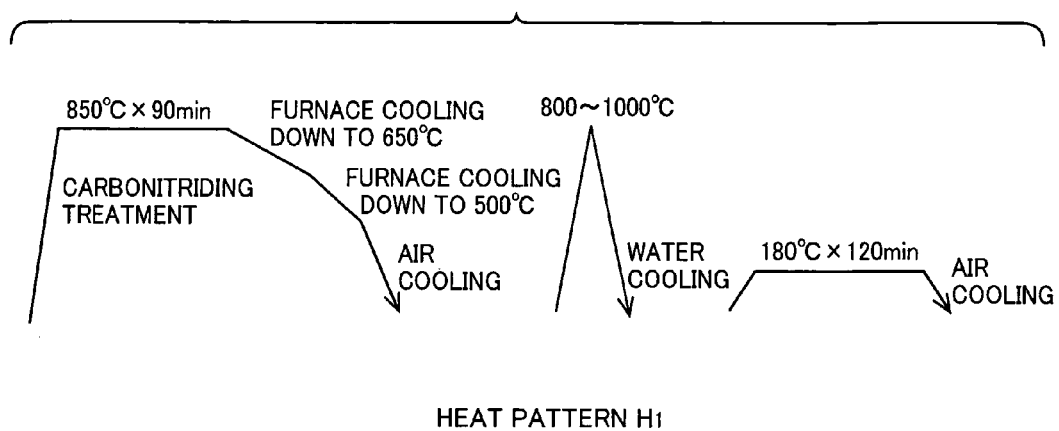
FIG. 8 illustrates a heat treatment pattern H1 in the embodiment.
Figure 9:
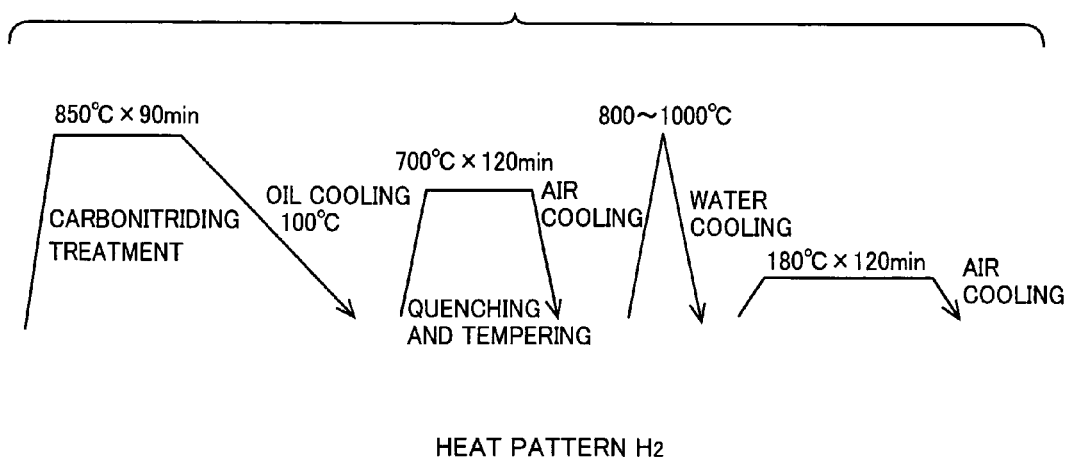
FIG. 9 illustrates a heat treatment pattern H2 in the embodiment.

A bearing steel SUJ2 or a carburized steel SCM420 was subjected to the heat treatment of heat pattern H1 (corresponding to FIG. 6) shown in FIG. 8 and the heat treatment of heat pattern H2 (corresponding to FIG. 7) shown in FIG. 9. That is, a steel pipe or a cold-worked steel product was initially subjected to carbonitriding treatment at $A_1$ point or higher, and thereafter subjected to either slow cooling (furnace cooling) to $A_1$ point or lower (heat pattern H1) or rapid cooling to $A_1$ point or lower followed by tempering (quenching and tempering) (heat pattern H2) in accordance with heat pattern H1 or H2. Thereafter, solely the surface portion corresponding to the rolling contact surface was subjected to high-frequency quenching. The temperatures in heat patterns H1 and H2 described above are as shown in FIGS. 8 and 9.

Figure 10:
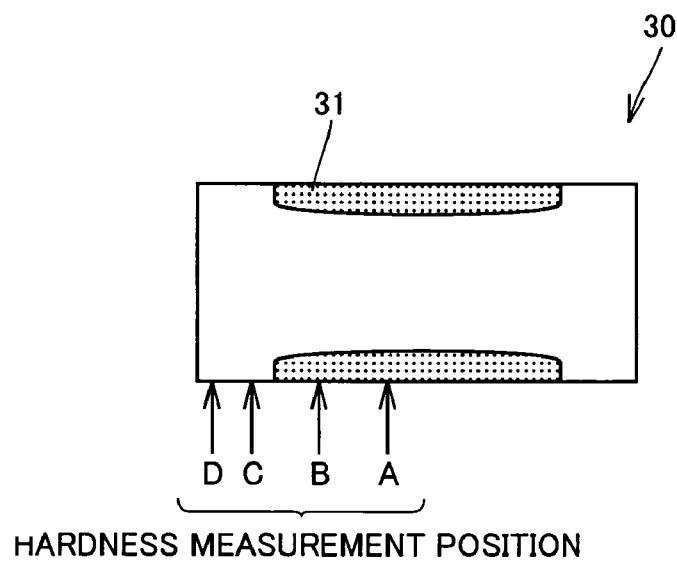
FIG. 10 shows hardness measurement positions in a specimen.

Using roller shaft 2 as a sample, in a specimen prepared through the heat treatment described above, the surface portion contained 15 to 35 volume % of retained austenite and attained ultrafine austenite grain size of No. 11 or larger. Hardness was measured with respect to this specimen. For comparison, hardness of a specimen J in a conventional example that was subjected solely to high-frequency quenching and not to carbonitriding treatment was also measured. A shape and hardness measurement position for each specimen is as shown in FIG. 10. A measurement result is shown in Table 1. It is noted that a dotted portion in FIG. 10 represents a hardened portion.

TABLE 1

Hardness Measurement Result

| Hardness measurement position (FIG. 10) | Conventional Example Specimen J | Example of the present invention | |
|---|---|---|---|
| | | Specimen 1 | Specimen 2 |
| A | 780 | 795 | 790 |
| B | 735 | 800 | 805 |
| C | 220 | 260 | 275 |
| D | 210 | 270 | 280 |
| Retained austenite amount (volume %) | 7.5 | 32 | 27 |
| Austenite grain size No. | 10.5 | 12 | 12 |

According to Table 1, specimens 1 and 2 according to the examples of the present invention attain very high hardness of HV 760 to 805 in surface portions A and B, while they attain hardness of HV 260 to 280 in positions C and D other than the surface portion. Hardness at positions C and D is suitable for caulking. On the other hand, reflecting the fact that the carbonitriding treatment was not performed in the conventional example, surface portions A and B attain hardness of HV 735 to 780, exhibiting variation in a range lower than the former, while hardness at measurement positions C and D is also low, that is, HV 210 to 240.

Figure 11:
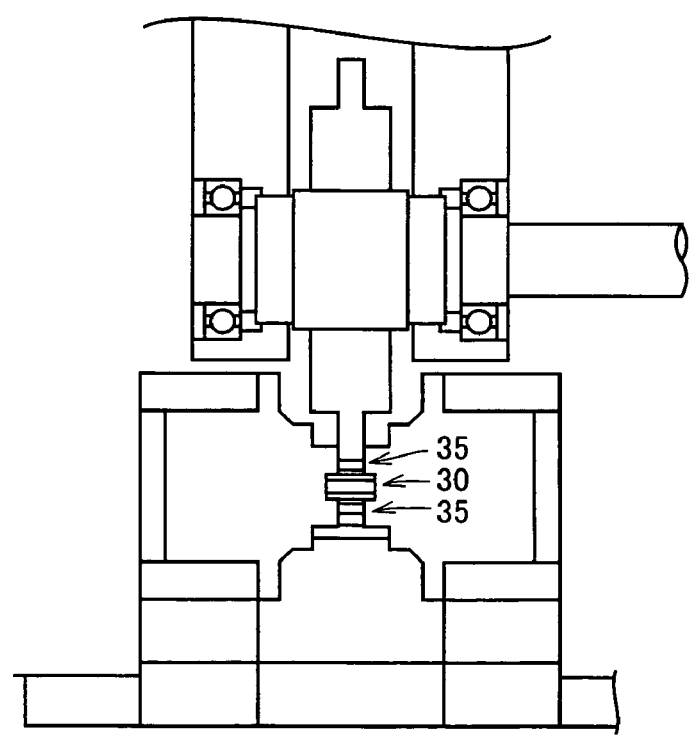
FIG. 11 shows a rolling contact fatigue test rig in outer ring rotation.

Then, an outer ring rotation type fatigue life test was conducted for specimens 1 and 2 described above. The specimens and test conditions are shown in Tables 2 and 3. A fatigue test rig is shown in FIG. 11. In the fatigue test rig, a roller 35 is arranged so as to sandwich a specimen 30 from above and below. Roller 35 comes in intimate contact with the surface portion of specimen 30 and rotates to apply external pressure, so as to apply stress to specimen 30.

TABLE 2

| | Specimen | Treatment | Austenite grain size No. at A point | Retained austenite amount (volume %) |
|---|---|---|---|---|
| Conventional Example | Specimen J | High-frequency quenching, applied solely on rolling contact surface | 10.5 | 7.5 |
| Example of the present invention | Specimen 1 Specimen 2 | Heat pattern $H_1$ Heat pattern $H_2$ | 12 12 | 32 27 |

TABLE 3

Fatigue Life Test Conditions

| Test rig | Outer ring rotation type life test rig |
|---|---|
| Test sample | Rocker arm bearing assembly product |
| Load (N) | 2200 N |
| Outer ring rotation speed | 7000 rpm |
| Lubrication | Engine oil 10w-30 |
| Oil temperature | 100° C. |
| Life | Separation life |

According to the test conditions described above, surface damage or internally originating separation occurs during the test. Therefore, by conducting this test, life with respect to both surface damage and internally originating separation can be tested. The result of this fatigue test is shown in Table 4.

TABLE 4

| | Fatigue Life Test Result | |
| --- | --- | --- |
| | Specimen | Ratio of life (L10) |
| Conventional Example | Specimen J | 1.0 |
| Example of the present invention | Specimen 1 | 3.1 |
| | Specimen 2 | 3.2 |

According to Table 4, specimens 1 and 2 according to the example of the present invention attain life three times as long as specimen J in the conventional example. It is considered that specimen J in the conventional example has shorter fatigue life due to its metal structure (austenite grain size, retained austenite amount) because carbonitriding treatment is not performed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A rolling bearing, comprising:
an outer member;
an inner member located inside said outer member; and
a rolling element interposed between said outer member and said inner member; wherein
at least one member of said outer member and said inner member has a nitrogen enriched layer,
in said at least one member, austenite grain size of a surface portion of an area in a rolling contact surface where said rolling element rolls is at least No. 11,
said surface portion of the area in said rolling contact surface includes 15 to 35 volume % of retained austenite,
a microstructure of an area other than the surface portion of the area in said rolling contact surface contains ferrite and carbide; and
an end portion of that member has hardness of at most HV (Vickers hardness) 300.

2. A cam-follower with roller employing the rolling bearing according to claim 1, wherein
a roller rolling along an inner circumference of an outer-roller is interposed between the outer-roller serving as said outer member and a shaft serving as said inner member,
said cam-follower is supported by said shaft, and
a portion where said roller rolls is the surface portion of the area in the rolling contact surface.

3. A cam abutting on the outer-roller in said cam-follower with roller according to claim 2, wherein
said cam has a nitrogen enriched layer in the surface portion abutting on said outer member, and
austenite grain size of the surface portion is at least No. 11.

4. The cam-follower with roller according to claim 2, wherein
said shaft has its end portion subjected to plastic working and is fixed to a roller support member.

5. The cam-follower with roller according to claim 4, wherein
a body of said cam follower is obtained by press-working.

6. A cam-follower with roller employing the rolling bearing according to claim 1, wherein
a roller rolling along an inner circumference of an outer-roller is interposed between the outer-roller serving as said outer member and a shaft serving as said inner member,
said cam-follower is supported by said shaft, and
a portion where said roller rolls is the surface portion of the area in the rolling contact surface.

7. The cam-follower with roller according to claim 6, wherein
said shaft has its end portion subjected to plastic working and is fixed to a roller support member.

8. The cam-follower with roller according to claim 7, wherein
a body of said cam follower is obtained by press-working.

9. The rolling bearing according to claim 1, wherein
said surface portion of the area in said rolling contact surface is subjected to high-frequency quenching.

10. A cam-follower with roller employing the rolling bearing according to claim 9, wherein
a roller rolling along an inner circumference of an outer-roller is interposed between the outer-roller serving as said outer member and a shaft serving as said inner member,
said cam-follower is supported by said shaft, and
a portion where said roller rolls is the surface portion of the area in the rolling contact surface.

11. The rolling bearing according to claim 1, wherein
said surface portion of the area in said rolling contact surface has hardness of at least HV653.

12. A cam-follower with roller employing the rolling bearing according to claim 11, wherein
a roller rolling along an inner circumference of an outer-roller is interposed between the outer-roller serving as said outer member and a shaft serving as said inner member,
said cam-follower is supported by said shaft, and
a portion where said roller rolls is the surface portion of the area in the rolling contact surface of said shaft.

13. The rolling bearing according to claim 1, wherein
said at least one member is subjected to any one of a treatment of carbonitriding the member at A1 or higher followed by slow cooling down to a point lower than A1 point and then subjecting said surface portion of the area in said rolling contact surface to high-frequency quenching, and a treatment of carbonitriding the member at A1 or higher followed by rapid cooling down to a point lower than A1 point, tempering at the point lower than A1 point, and subjecting said surface portion of the area in said rolling contact surface to high-frequency quenching.

14. A cam-follower with roller employing the rolling bearing according to claim 13, wherein
a roller rolling along an inner circumference of an outer-roller is interposed between the outer-roller serving as said outer member and a shaft serving as said inner member,
said cam-follower is supported by said shaft, and
a portion where said roller rolls is the surface portion of the area in the rolling contact surface of said shaft.

* * * * *